(12) United States Patent
Hadjiahmad et al.

(10) Patent No.: US 7,406,085 B2
(45) Date of Patent: Jul. 29, 2008

(54) AUTO CONFIGURATION FOR ASYNCHRONOUS TRANSFER MODE BASED ACCESS DEVICE

(75) Inventors: Massoud Hadjiahmad, Thornhill (CA); Tuan Hoang, North York (CA); Andre Straker-Payne, Etobicoke (CA)

(73) Assignee: Analog Devices, Inc., Norwood, MA (US)

( * ) Notice: Subject to any disclaimer, the term of this patent is extended or adjusted under 35 U.S.C. 154(b) by 531 days.

(21) Appl. No.: 10/993,835

(22) Filed: Nov. 19, 2004

(65) Prior Publication Data

US 2006/0109852 A1    May 25, 2006

(51) Int. Cl.
H04L 12/28 (2006.01)
(52) U.S. Cl. .............................. 370/395.54; 370/395.2; 370/395.3; 370/395.52; 370/395.6; 370/395.65
(58) Field of Classification Search ............ 370/395.54, 370/395.2, 395.3, 395.52, 395.6, 395.65
See application file for complete search history.

(56) References Cited

U.S. PATENT DOCUMENTS

| | | | |
|---|---|---|---|
| 6,603,770 B2 * | 8/2003 | Lin et al. ..................... | 370/401 |
| 6,611,522 B1 | 8/2003 | Zheng et al. | |
| 6,633,571 B1 | 10/2003 | Sakamoto et al. | |
| 6,636,505 B1 | 10/2003 | Wang et al. | |
| 6,646,985 B1 | 11/2003 | Park et al. | |
| 6,650,640 B1 | 11/2003 | Muller et al. | |
| 6,650,646 B1 | 11/2003 | Galway et al. | |
| 6,658,021 B1 | 12/2003 | Bromley et al. | |
| 6,678,273 B1 | 1/2004 | Brown | |
| 6,683,885 B1 | 1/2004 | Sugai et al. | |
| 6,687,247 B1 | 2/2004 | Wilford et al. | |
| 6,693,878 B1 | 2/2004 | Daruwalla et al. | |
| 6,694,372 B1 | 2/2004 | Grossman | |
| 6,701,439 B1 | 3/2004 | Dunn | |
| 6,917,614 B1 * | 7/2005 | Laubach et al. ............. | 370/392 |
| 6,977,922 B2 * | 12/2005 | Blanset et al. ............... | 370/352 |
| 7,215,676 B2 * | 5/2007 | Lee ......................... | 370/395.5 |
| 2002/0026504 A1 * | 2/2002 | Lo ............................. | 709/220 |
| 2002/0122425 A1 * | 9/2002 | Gullicksen ............... | 370/395.1 |
| 2004/0052263 A1 | 3/2004 | Xu | |
| 2004/0105444 A1 | 6/2004 | Korotin et al. | |

* cited by examiner

Primary Examiner—Wing F. Chan
Assistant Examiner—Anthony Sol
(74) Attorney, Agent, or Firm—Gauthier & Connors LLP

(57) ABSTRACT

A method for obtaining virtual path identifier, virtual channel identifier, and encapsulation values in an asynchronous transfer mode access device for a network using either non-static or static internet protocol address assignments and asynchronous transfer mode adaptation layer 5. In the non-static environment, a plurality of discovery packets are generated, but in the static environment, a plurality of address resolution protocol packets are generated. Headers are added to the plurality of packets, such that a first set of packets, each packet including a logical link control header, and a second set of packets, each packet including a virtual channel multiplexed header, are realized. The first and second sets of packets are encapsulated and then transmitted to a central office. It is determined if a valid response packet has been received to any of the transmitted packets, and a virtual path identifier/virtual channel identifier pair value and encapsulation value are established, based upon a virtual path identifier/virtual channel identifier pair value and encapsulation value of the received valid response. The established virtual path identifier/virtual channel identifier pair value and encapsulation value are utilized for transferring data between the asynchronous transfer mode access device and a central office.

5 Claims, 3 Drawing Sheets

AUTO CONFIGURATION FOR ASYNCHRONOUS TRANSFER MODE BASED ACCESS DEVICE

FIELD OF THE PRESENT INVENTION

The present invention is directed to configuring virtual path identifiers, virtual channel identifiers, and asynchronous transfer mode adaptation layer 5 encapsulation on asynchronous transfer mode based network access devices to enable the data transfer to and from a central office gateway. More particularly, the present invention is directed to configuring virtual path identifiers, virtual channel identifiers, and asynchronous transfer mode adaptation layer 5 encapsulation on asynchronous transfer mode based network access devices for networks that use non-static or static internet protocol address assignments.

BACKGROUND OF THE PRESENT INVENTION

Conventional asynchronous transfer mode access devices used for obtaining a broadband connection to the internet must be configured to use the specific packet encapsulation method required by the provider of the broadband connection service before use. This complication results in either increased manufacturing costs for the access devices if the configuration is done at the factory or more costly customer service if the configuration must be done at the customer's site FIG. 1 illustrates how a conventional access device (30 and 40) is connected to the internet 60. End user's computer equipment (10, 11, 12, 21, 22, or 23) is connected to an asynchronous transfer mode access device (30 or 40) using direct connection or a local network (15 or 25). Before the asynchronous transfer mode access device (30 or 40) can provide a connection to the internet 60, it must be configured to meet the packet encapsulation, Virtual Path Identifier, and virtual Channel Identifier requirements of the equipment in the central office 50. Once the asynchronous transfer mode access device (30 or 40) is configured, data communication over a phone line, cable line, microwave transmission, radio-frequency, or other communication channel (35 or 45) can proceed.

The equipment in the central office 50 manages data flow to and from the asynchronous transfer mode access devices (30 and 40). The equipment in the central office 50 also manages data flow to and from the internet 60 using its own internet connection 55, routing the information back to the correct individual end user's computer equipment (10, 11, 12, 21, 22, or 23).

Although conventional methods for automatically configuring the asynchronous transfer mode access devices (30 and 40) when the asynchronous transfer mode access devices are installed has been proposed. These methods are complicated in that they require changes in the central office 50 as well as in the asynchronous transfer mode access devices (30 and 40). The required changes in the central office to implement the methods are barriers to market acceptance.

Another method for configuring the asynchronous transfer mode access devices is described in U.S. Pat. No. 6,636,505, entitled "Method For Service Provisioning A Broadband Modem." The entire content of U.S. Pat. No. 6,636,505 is hereby incorporated by reference.

U.S. Pat. No. 6,636,505 discloses a way for multiple internet service providers to be serviced by one network service provider, requiring special software to reside on the end user's computer equipment. The network service provider must implement a special configuration to support the method. Although this method provide a way to configure asynchronous transfer mode access devices, the method fails to address the problem of the need for special configuration of the central office, which, as noted above, is a barrier to market acceptance.

Therefore, it is desirable to provide a method of automatically configuring an access device without requiring special changes to the configuration of the central office. Moreover, it is desirable to provide a method that eliminates the need for the end user to configure the virtual path identifiers, virtual channel identifiers, and asynchronous transfer mode adaptation layer 5 encapsulation on asynchronous transfer mode based network access devices to enable the data transfer to and from a central office gateway.

It is further desirable to provide a method that eliminates the need for the end user to configure the virtual path identifiers, virtual channel identifiers, and asynchronous transfer mode adaptation layer 5 encapsulation on asynchronous transfer mode based network access devices to enable the data transfer to and from a central office for networks that use static internet protocol address assignments.

Also, it is desirable to provide a method that eliminates the need for the end user to configure the virtual path identifiers, virtual channel identifiers, and asynchronous transfer mode adaptation layer 5 encapsulation on asynchronous transfer mode based network access devices to enable the data transfer to and from a central office for networks that use non-static internet protocol address assignments.

SUMMARY OF THE PRESENT INVENTION

One aspect of the present invention is a method for obtaining virtual path identifier, virtual channel identifier, and encapsulation values in an asynchronous transfer mode access device for a network using non-static internet protocol address assignments and asynchronous transfer mode adaptation layer 5. The method generates a plurality of discovery packets; adds headers to the plurality of discovery packets, such that a first set of discovery packets, each packet including a logical link control header, and a second set of discovery packets, each packet including a virtual channel multiplexed header, are realized; encapsulates the first and second sets of discovery packets; transmits all the encapsulated discovery packets to a central office; determines if a valid response packet has been received to any of the transmitted packets; establishes a virtual path identifier/virtual channel identifier pair value and encapsulation value based upon a virtual path identifier/virtual channel identifier pair value and encapsulation value of the received valid response; and utilizes the established virtual path identifier/virtual channel identifier pair value and encapsulation value for transferring data between the asynchronous transfer mode access device and a central office.

Another aspect of the present invention is a method for obtaining virtual path identifier (VPI), virtual channel identifier (VCI), and encapsulation values in an asynchronous transfer mode access device having a table of pre-defined VPI/VCI pairs for a network using non-static internet protocol address assignments and asynchronous transfer mode adaptation layer 5. The method generates a pair of point-to-point protocol over Ethernet discovery packets for each VPI/VCI pair; generates a pair of plurality of dynamic host configuration protocol discovery packets for each VPI/VCI pair, adds logical link control headers to the dynamic host configuration protocol discovery packets, such that each VPI/VCI pair has an associated dynamic host configuration protocol discovery packet with a logical link control header; adds logical link control headers to the point-to-point protocol over Ethernet discovery packets, such that each VPI/VCI pair has an associated point-to-point protocol over Ethernet discovery packet with a logical link control header; adds virtual channel multiplexed headers to the dynamic host configuration protocol discovery packets, such that each VPI/VCI pair has an associated dynamic host configuration protocol discovery packet with a virtual channel multiplexed header; adds virtual channel multiplexed headers to the point-to-point protocol over Ethernet discovery packets, such that each VPI/VCI pair has an associated point-to-point protocol over Ethernet discovery packet with a virtual channel multiplexed header; encapsulates the discovery packets with associated headers in an asynchronous transfer mode adaptation layer 5 format, such that each VPI/VCI pair has an associated encapsulated point-to-point protocol over Ethernet discovery packet with a logical link control header, an associated encapsulated dynamic host configuration protocol discovery packet with a logical link control header, an associated encapsulated point-to-point protocol over Ethernet discovery packet with a virtual channel multiplexed header, and an associated encapsulated dynamic host configuration protocol discovery packet with a virtual channel multiplexed header; transmits, for each VPI/VCI pair, the associated encapsulated discovery packets to a central office; determines if a valid response packet has been received to any of the transmitted discovery packets for a given VPI/VCI pair; establishes a virtual path identifier/virtual channel identifier pair value and encapsulation value based upon an encapsulation value of the received valid response and the VPI/VCI pair associated therewith; and utilizes the established virtual path identifier/virtual channel identifier pair value and encapsulation value for transferring data between the asynchronous transfer mode access device and a central office.

Another aspect of the present invention is a method for obtaining virtual path identifier, virtual channel identifier, and encapsulation values in an asynchronous transfer mode access device for a network using static internet protocol address assignments and asynchronous transfer mode adaptation layer 5. The method generates a plurality of address resolution protocol packets; adds headers to the plurality of address resolution protocol packets, such that a first set of address resolution protocol packets, each packet including a logical link control header, and a second set of address resolution protocol packets, each packet including a virtual channel multiplexed header, are realized; encapsulates the first and second sets of address resolution protocol packets; transmits all the encapsulated address resolution protocol packets to a central office; determines if a valid response packet has been received to any of the transmitted address resolution protocol packets; establishes a virtual path identifier/virtual channel identifier pair value and encapsulation value based upon a virtual path identifier/virtual channel identifier pair value and encapsulation value of the received valid response; and utilizes the established virtual path identifier/virtual channel identifier pair value and encapsulation value for transferring data between the asynchronous transfer mode access device and a central office.

Another aspect of the present invention is a method for obtaining virtual path identifier (VPI), virtual channel identifier (VCI), and encapsulation values in an asynchronous transfer mode access device having a table of pre-defined VPI/VCI pairs for a network using static internet protocol address assignments and asynchronous transfer mode adaptation layer 5. The method generates a pair of address resolution protocol packets, for each VPI/VCI pair, based upon a gateway internet protocol address; adds logical link control headers to the address resolution protocol packets, such that each VPI/VCI pair has an associated address resolution protocol packet with a logical link control header; adds virtual channel multiplexed headers to the address resolution protocol packets, such that each VPI/VCI pair has an associated address resolution protocol packet with a virtual channel multiplexed header; encapsulates the address resolution protocol packets with associated headers in an asynchronous transfer mode adaptation layer 5 format, such that each VPI/VCI pair has an associated encapsulated address resolution protocol packet with a logical link control header and an associated encapsulated address resolution protocol packet with a virtual channel multiplexed header; transmits, for each VPI/VCI pair, the associated encapsulated address resolution protocol packets to a central office; determines if a valid response packet has been received to any of the transmitted address resolution protocol packets for a given VPI/VCI pair; establishes a virtual path identifier/virtual channel identifier pair value and encapsulation value based upon an encapsulation value of the received valid response and the VPI/VCI pair associated therewith; and utilizes the established virtual path identifier/virtual channel identifier pair value and encapsulation value for transferring data between the asynchronous transfer mode access device and a central office.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

Figure 1:
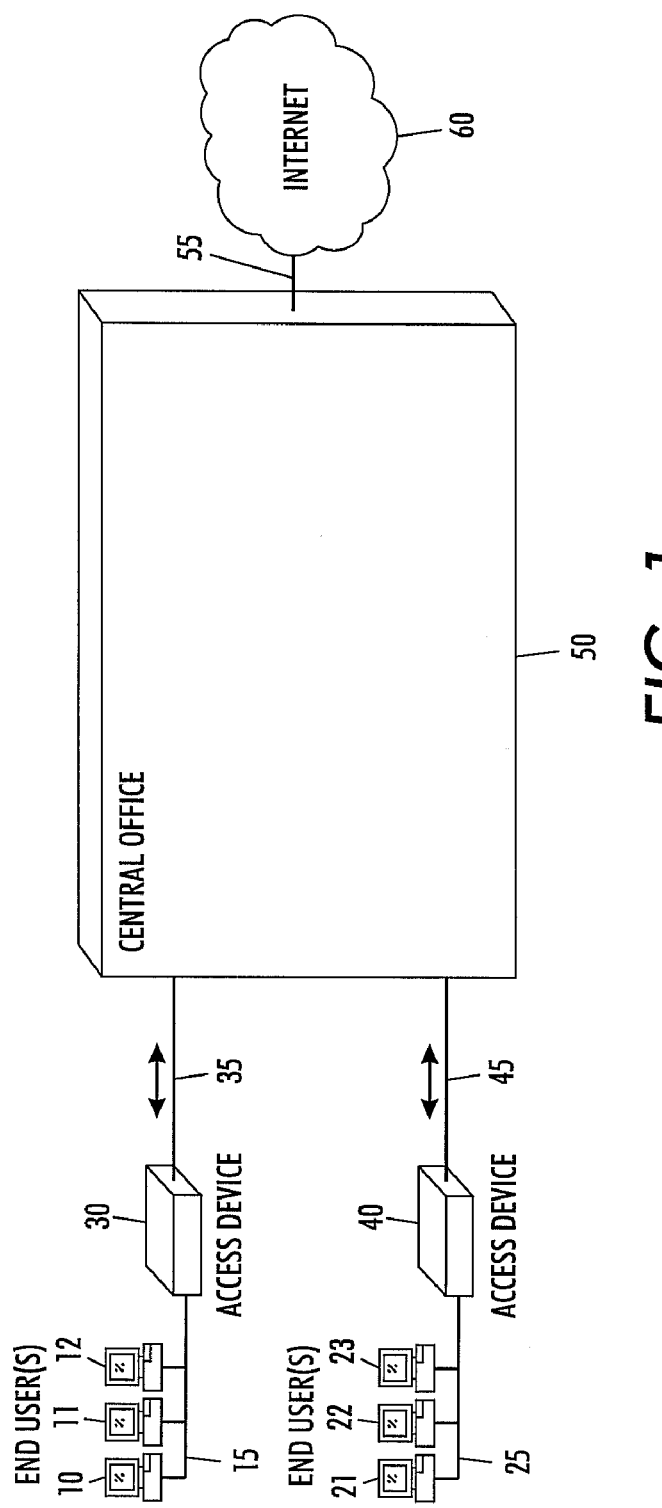
FIG. 1 illustrates a block diagram of a conventional use of asynchronous transfer mode access devices.

The present invention will be described in connection with specific embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

The present invention is a method by which an asynchronous transfer mode access device can automatically configure itself to encapsulate, that is to create data packets, according to the encapsulation values required by a central office to which it is connecting, which may correspond to either (a) logical link control or (b) virtual channel multiplexing.

Figure 2:
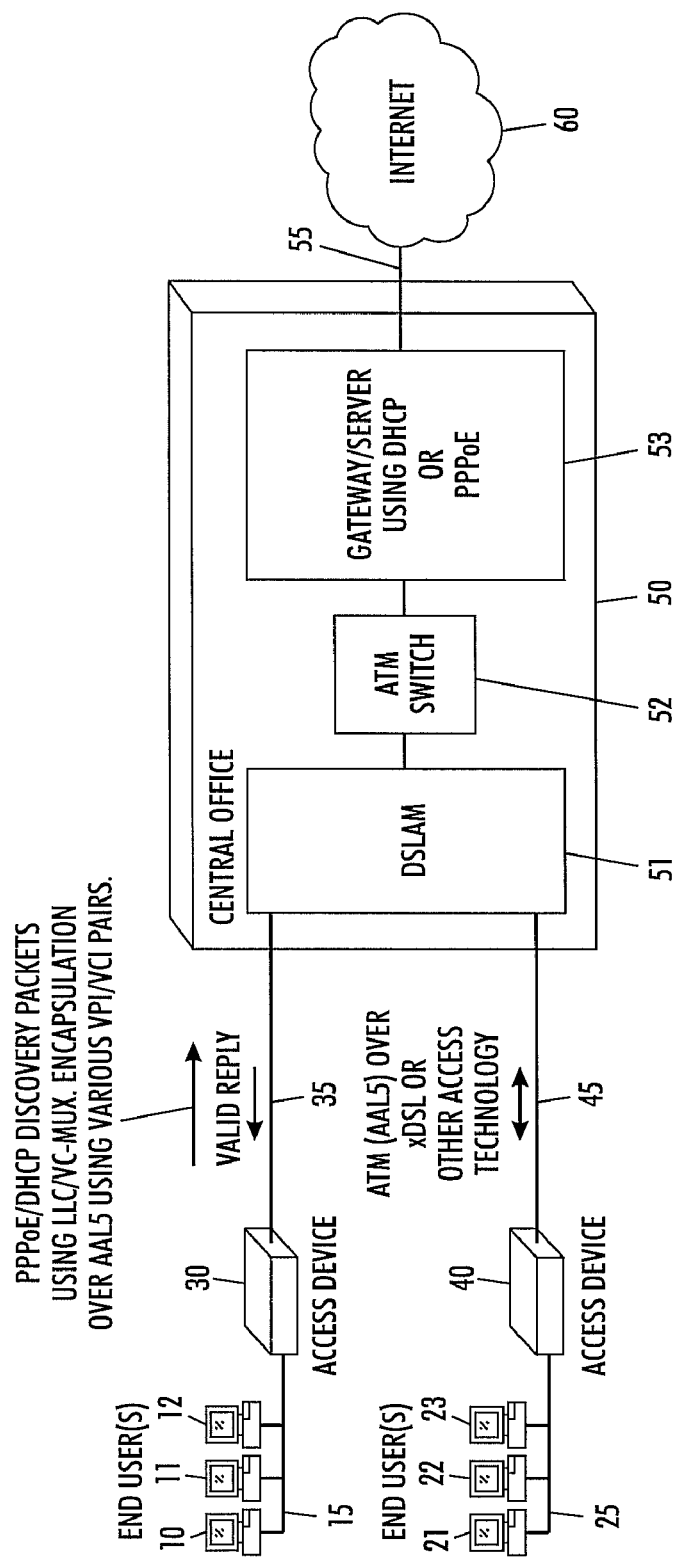
FIG. 2 illustrates a block diagram of an automatic configuration of asynchronous transfer mode access devices when non-static internet protocol addressing is used according to the concepts of the present invention.
Figure 3:
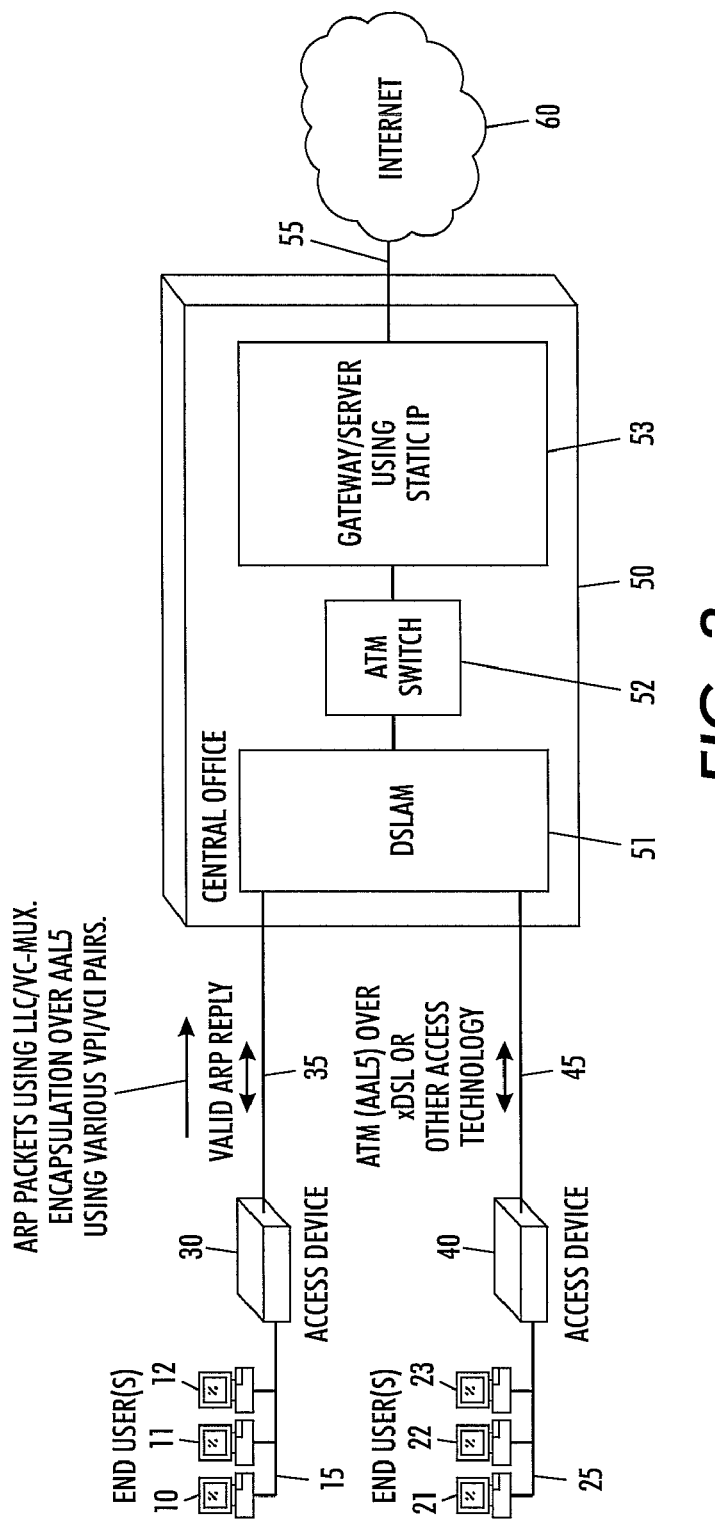
FIG. 3 illustrates a block diagram of an automatic configuration of asynchronous transfer mode access devices when static internet protocol addressing is used according to the concepts of the present invention.

FIGS. 2 and 3 illustrate the present invention in two different embodiments:

(a) using non-static internet protocol addresses and/or (b) using static internet protocol addresses. In both embodiments, the role of the digital subscriber line access multiplexer 51 and of the asynchronous transfer mode switch 52 will be the same. However, the gateway server 53 in each of the embodiments behaves differently. The gateway server 53 can be configured to use any or all of the following (a) dynamic host configuration protocol, (b) point-to-point over Ethernet, and/or (c) static internet protocol addressing using address resolution protocol.

In the first embodiment, illustrated by FIG. 2, it can use either (a) dynamic host configuration protocol or (b) point-to-point over Ethernet.

In the second embodiment, illustrated by FIG. 3, it uses (c) static internet protocol addressing using address resolution protocol.

In both embodiments, the digital subscriber line access multiplexer 51 receives multiple concurrent incoming data packets and transmits them to the asynchronous transfer mode switch 52 in the conventional manner. The digital subscriber line access multiplexer 51 also receives data packets from the asynchronous transfer mode switch 52 in the conventional manner and transmits them to the proper destination, which is the proper asynchronous transfer mode access device (30 or 40) in the conventional manner, based on their header information.

In both embodiments, the asynchronous transfer mode switch 52 receives data packets from the digital subscriber line access multiplexer 51 and transmits the data packets to the gateway server 53 in the conventional manner and it also receives data packets from the gateway server 53 and transmits them to the digital subscriber line access multiplexer 51 in the conventional manner. The role of the asynchronous transfer mode switch 52 is to transmit the data packets in 53-byte segments or cells, thus enabling optimal throughput, according to the industry standard encapsulation method called asynchronous transfer mode adaptation layer 5.

The process illustrated by FIG. 2 is as follows. The asynchronous transfer mode access device (30 or 40) begins operation by transmitting four different discovery packets, which are standard messages to the network gateway server 53, requesting a return message. Each of these discovery packets is encapsulated by the asynchronous transfer mode access device (30 or 40) using the asynchronous transfer mode adaptation layer 5 method. The asynchronous transfer mode adaptation layer 5 method creates data packets that are segmented into 53-byte cells, which are transmitted separately to the network and reassembled at their destinations.

The four discovery packets are of the following four formats: (a) having both logical link control and point-to-point protocol over Ethernet header information, (b) having both virtual channel multiplexing and point-to-point protocol over Ethernet header information, (c) having both logical link control and dynamic host configuration protocol header information, and/or (d) having both virtual channel multiplexing and dynamic host configuration protocol header information.

Only a discovery packet in the proper format that corresponds to the configuration of the equipment (51, 52, and 53) in the central office 50 can cause a return response packet to be generated. Thus, the asynchronous transfer mode access device (30 or 40), according to the concepts of the present invention, will discover the proper format for all subsequent data communication.

The asynchronous transfer mode access device (30 or 40) will detect whether the return response header contains logical link control or virtual channel multiplexing header information and use that type of header information in all subsequent data communication. The asynchronous transfer mode access device (30 or 40) will also detect whether the return response header contains point-to-point protocol over Ethernet or dynamic host configuration protocol header information and use that type of header information in all subsequent data communication.

The process is repeated for each of the values in the industry compliant table of virtual path identifier and virtual channel identifier pairs stored in the access device (30 or 40). When a return response packet is received, the asynchronous transfer mode access device (30 or 40) will incorporate the virtual path identifier and virtual channel identifier pair of the header of the return response packet into the header information for all subsequent data communication.

Once the process is complete, the end user's equipment (10, 11, 12, 21, 22, or 23) will be able to access the internet 60 through the equipment (51, 52, or 53) at the central office 50 using the central office's internet connection 55 because the asynchronous transfer mode access device (30 or 40) will be using the header information that corresponds to the configuration of the equipment (51, 52, or 53) in the central office 50.

The process illustrated by FIG. 3 is as follows. The asynchronous transfer mode access device (30 or 40) begins operation by transmitting two different discovery packets which are standard messages to the network gateway server 53 requesting a return message. Each of these discovery packets is encapsulated by the asynchronous transfer mode access device (30 or 40) using asynchronous transfer mode adaptation layer 5 method. The asynchronous transfer mode adaptation layer 5 method creates data packets that are segmented into 53-byte cells which are transmitted separately to the network and reassembled at their destination. Each of the discovery packets will contain address resolution protocol header information containing the static internet protocol address information that corresponds to the end users' device (10, 11, 12, 20, 21, and 22).

The two discovery packets are of the following two formats: (a) having logical link control header information, and/or (b) having virtual channel multiplexing header information.

Only a discovery packet in the proper format that corresponds to the configuration of the equipment (51, 52, and 53) in the central office 50 can cause a return response packet to be generated. Thus, the asynchronous transfer mode access device (30 or 40), according to the concepts of the current invention, will discover the proper format for all subsequent data communication. The asynchronous transfer mode access device (30 or 40) will detect whether the header contains logical link control or virtual channel multiplexing header information and use that type of header information in all subsequent data communication.

The process is repeated for each of the values in the industry compliant table of virtual path identifier and virtual channel identifier pairs stored in the access device (30 or 40). When a return response packet is received, the asynchronous transfer mode access device (30 or 40) will incorporate the virtual path identifier and virtual channel identifier pair of the header of the return response packet into the header information for all subsequent data communication.

Once the process is complete, the end user's equipment (10, 11, 12, 21, 22, or 23) will be able to access the internet 60 through the equipment (51, 52, or 53) at the central office 50 using the central office's internet connection 55 because the asynchronous transfer mode access device (30 or 40) will be using the header information that corresponds to the configuration of the equipment (51, 52, or 53) in the central office 50.

As noted above, one embodiment of the present invention obtains virtual path identifier, virtual channel identifier, and encapsulation values in an asynchronous transfer mode access device for a network using static internet protocol address assignments and asynchronous transfer mode adaptation layer 5.

The process further generates a plurality of discovery packets; adds headers to the plurality of discovery packets, such that a first set of discovery packets, each packet including a logical link control header, and a second set of discovery packets, each packet including a virtual channel multiplexed header, are realized; and encapsulates the first and second sets of discovery packets.

The process transmits all the encapsulated discovery packets to a central office; determines if a valid response packet has been received to any of the transmitted packets; and establishes a virtual path identifier/virtual channel identifier pair value and encapsulation value based upon a virtual path identifier/virtual channel identifier pair value and encapsulation value of the received valid response.

Finally, the process utilizes the established virtual path identifier/virtual channel identifier pair value and encapsulation value for transferring data between the asynchronous transfer mode access device and a central office.

The address resolution protocol packets may be encapsulated in asynchronous transfer mode adaptation layer 5 packet format. Each asynchronous transfer mode adaptation layer 5 packet may be segmented into fifty-three byte cells.

Another embodiment of the present invention obtains virtual path identifier (VPI), virtual channel identifier (VCI), and encapsulation values in an asynchronous transfer mode access device having a table of pre-defined VPI/VCI pairs for a network using non-static internet protocol address assignments and asynchronous transfer mode adaptation layer 5.

The process generates a pair of point-to-point protocol over Ethernet discovery packets for each VPI/VCI pair; generates a pair of plurality of dynamic host configuration protocol discovery packets for each VPI/VCI pair; and adds logical link control headers to the dynamic host configuration protocol discovery packets, such that each VPI/VCI pair has an associated dynamic host configuration protocol discovery packet with a logical link control header.

The process adds logical link control headers to the point-to-point protocol over Ethernet discovery packets, such that each VPI/VCI pair has an associated point-to-point protocol over Ethernet discovery packet with a logical link control header; adds virtual channel multiplexed headers to the dynamic host configuration protocol discovery packets, such that each VPI/VCI pair has an associated dynamic host configuration protocol discovery packet with a virtual channel multiplexed header; and adds virtual channel multiplexed headers to the point-to-point protocol over Ethernet discovery packets, such that each VPI/VCI pair has an associated point-to-point protocol over Ethernet discovery packet with a virtual channel multiplexed header.

The process encapsulates the discovery packets with associated headers in an asynchronous transfer mode adaptation layer 5 format, such that each VPI/VCI pair has an associated encapsulated point-to-point protocol over Ethernet discovery packet with a logical link control header, an associated encapsulated dynamic host configuration protocol discovery packet with a logical link control header, an associated encapsulated point-to-point protocol over Ethernet discovery packet with a virtual channel multiplexed header, and an associated encapsulated dynamic host configuration protocol discovery packet with a virtual channel multiplexed header; transmits, for each VPI/VCI pair, the associated encapsulated discovery packets to a central office; determines if a valid response packet has been received to any of the transmitted discovery packets for a given VPI/VCI pair; and establishes a virtual path identifier/virtual channel identifier pair value and encapsulation value based upon an encapsulation value of the received valid response and the VPI/VCI pair associated therewith; and utilizes the established virtual path identifier/virtual channel identifier pair value and encapsulation value for transferring data between the asynchronous transfer mode access device and a central office.

The encapsulated address resolution protocol packets may be segmented into fifty-three byte cells.

A further embodiment of the present invention obtains virtual path identifier, virtual channel identifier, and encapsulation values in an asynchronous transfer mode access device for a network using static internet protocol address assignments and asynchronous transfer mode adaptation layer 5. The process generates a plurality of address resolution protocol packets; adds headers to the plurality of address resolution protocol packets, such that a first set of address resolution protocol packets, each packet including a logical link control header, and a second set of address resolution protocol packets, each packet including a virtual channel multiplexed header, are realized; and encapsulates the first and second sets of address resolution protocol packets.

The process transmits all the encapsulated address resolution protocol packets to a central office; determines if a valid response packet has been received to any of the transmitted address resolution protocol packets; and establishes a virtual path identifier/virtual channel identifier pair value and encapsulation value based upon a virtual path identifier/virtual channel identifier pair value and encapsulation value of the received valid response.

Finally, the process utilizes the established virtual path identifier/virtual channel identifier pair value and encapsulation value for transferring data between the asynchronous transfer mode access device and a central office.

A plurality of point-to-point protocol over Ethernet discovery packets and a plurality of dynamic host configuration protocol discovery packets may be generated.

Logical link control headers and virtual channel multiplexed headers may be added to the plurality of point-to-point protocol over Ethernet discovery packets and a plurality of dynamic host configuration protocol discovery packets such that a first set of point-to-point protocol over Ethernet discovery packets, each point-to-point protocol over Ethernet discovery packet including a logical link control header. A second set of point-to-point protocol over Ethernet discovery packets, each point-to-point protocol over Ethernet discovery packet may include a virtual channel multiplexed header. A third set of dynamic host configuration protocol discovery packets each dynamic host configuration protocol discovery packet may include a logical link control header. A fourth set of dynamic host configuration protocol discovery packets, each dynamic host configuration protocol discovery packet may include a virtual channel multiplexed header.

The discovery packets may be encapsulated in asynchronous transfer mode adaptation layer 5 packet format. The process may also segment each asynchronous transfer mode adaptation layer 5 packet into fifty-three byte cells.

A further embodiment of the present invention obtains virtual path identifier (VPI), virtual channel identifier (VCI), and encapsulation values in an asynchronous transfer mode access device having a table of pre-defined VPI/VCI pairs for a network using static internet protocol address assignments and asynchronous transfer mode adaptation layer 5. The process generates a pair of address resolution protocol packets, for each VPI/VCI pair, based upon a gateway internet protocol address; adds logical link control headers to the address resolution protocol packets, such that each VPI/VCI pair has an associated address resolution protocol packet with a logical link control header; adds virtual channel multiplexed headers to the address resolution protocol packets, such that each VPI/VCI pair has an associated address resolution protocol packet with a virtual channel multiplexed header; and encapsulates the address resolution protocol packets with associated headers in an asynchronous transfer mode adaptation layer 5 format, such that each VPI/VCI pair has an associated encapsulated address resolution protocol packet with a logical link control header and an associated encapsulated address resolution protocol packet with a virtual channel multiplexed header.

The process transmits, for each VPI/VCI pair, the associated encapsulated address resolution protocol packets to a central office; determines if a valid response packet has been received to any of the transmitted address resolution protocol packets for a given VPI/VCI pair; establishes a virtual path identifier/virtual channel identifier pair value and encapsulation value based upon an encapsulation value of the received valid response and the VPI/VCI pair associated therewith; and utilizes the established virtual path identifier/virtual channel identifier pair value and encapsulation value for transferring data between the asynchronous transfer mode access device and a central office.

A plurality of point-to-point protocol over Ethernet discovery packets and a plurality of dynamic host configuration protocol discovery packets may be generated.

In summary, the present invention eliminates the need for the end user to configure the virtual path identifier, virtual channel identifier, and asynchronous transfer mode adaptation layer 5 encapsulation on an asynchronous transfer mode based network access device to enable the data transfer to and from the central office gateway. The auto-configuration method of the present invention can be utilized with networks that use static internet protocol address assignments. The present invention emulates a device trying to obtain information about the network devices and their associated internet protocol addresses by generating address resolution protocol packets using the known gateway internet protocol address.

The present invention uses a list of predefined virtual path identifier virtual channel identifier pairs to generate the address resolution protocol packets for each pair and each possible encapsulation. If the auto-configuration module receives a valid response (address resolution protocol reply) for a specific combination of the aforementioned variables/parameters, it will have detected the required parameters that are used for that specific access point to the network.

The auto-configuration method of the present invention can also be utilized with networks that use non-static internet protocol address assignments. These networks most commonly use a PPPoE or a DHCP server. The internet protocol address is assigned to the end-user via DHCP or PPPoE protocols. The present invention emulates a device trying to obtain an internet protocol address by generating DHCP and PPPoE discovery packets.

The present invention uses a list of predefined virtual path identifier virtual channel identifier pairs to generate the DHCP and PPPoE discovery packets for each pair and each possible encapsulation. If the auto-configuration module receives a valid response for a specific combination of the aforementioned variables/parameters, it will have detected the required parameters that are used for that specific access point to the network.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A method for obtaining virtual path identifier, virtual channel identifier, and encapsulation values in an asynchronous transfer mode access device for a network using non-static internet protocol address assignments and asynchronous transfer mode adaptation layer 5, comprising:
    (a) generating a plurality of point-to-point protocol over Ethernet discovery packets and a plurality of dynamic host configuration protocol discovery packets;
    (b) adding headers to the plurality of point-to-point protocol over Ethernet discovery packets and plurality of dynamic host configuration protocol discovery packets to generate a first set of point-to-point protocol over Ethernet discovery packets, a second set of point-to-point protocol over Ethernet discovery packets, a first set of dynamic host configuration protocol discovery packets, and a second set of dynamic host configuration protocol discovery packets, each packet in the first set of point-to-point protocol over Ethernet discovery packets including a logical link control header, each packet in the second set of point-to-point protocol over Ethernet discovery packets including a virtual channel multiplexed header, first set of dynamic host configuration protocol discovery packets including a logical link control header, each packet in the second set of dynamic host configuration protocol discovery packets including a virtual channel multiplexed header;
    (c) encapsulating all the sets of discovery packets;
    (d) transmitting the encapsulated discovery packets to a central office;
    (e) determining if a valid response packet has been received to any of the transmitted packets;
    (f) establishing a virtual path identifier/virtual channel identifier pair value and encapsulation value based upon a virtual path identifier/virtual channel identifier pair value and encapsulation value of the received valid response; and
    (g) utilizing the established virtual path identifier/virtual channel identifier pair value and encapsulation value for transferring data between the asynchronous transfer mode access device and a central office.

2. The method as claimed in claim 1, wherein the discovery packets are encapsulated in asynchronous transfer mode adaptation layer 5 packet format.

3. The method as claimed in claim 2, further comprising:
    (h) segmenting each asynchronous transfer mode adaptation layer 5 packet into fifty-three byte cells.

4. A method for obtaining virtual path identifier (VPI), virtual channel identifier (VCI), and encapsulation values in an asynchronous transfer mode access device having a table of pre-defined VPI/VCI pairs for a network using non-static internet protocol address assignments and asynchronous transfer mode adaptation layer 5, comprising:
    (a) generating a pair of point-to-point protocol over Ethernet discovery packets for each VPI/VCI pair;

(b) generating a pair of dynamic host configuration protocol discovery packets for each VPI/VCI pair;

(c) adding logical link control headers to one of the pair of dynamic host configuration protocol discovery packets, such that each VPI/VCI pair has an associated dynamic host configuration protocol discovery packet with a logical link control header;

(d) adding logical link control headers to one of the pair of point-to-point protocol over Ethernet discovery packets, such that each VPI/VCI pair has an associated point-to-point protocol over Ethernet discovery packet with a logical link control header;

(e) adding virtual channel multiplexed headers to one of the pair of dynamic host configuration protocol discovery packets, such that each VPI/VCI pair has an associated dynamic host configuration protocol discovery packet with a virtual channel multiplexed header;

(f) adding virtual channel multiplexed headers to one of the pair of point-to-point protocol over Ethernet discovery packets, such that each VPI/VCI pair has an associated point-to-point protocol over Ethernet discovery packet with a virtual channel multiplexed header;

(g) encapsulating the discovery packets with associated headers in an asynchronous transfer mode adaptation layer 5 format, such that each VPI/VCI pair has an associated encapsulated point-to-point protocol over Ethernet discovery packet with a logical link control header, an associated encapsulated dynamic host configuration protocol discovery packet with a logical link control header, an associated encapsulated point-to-point protocol over Ethernet discovery packet with a virtual channel multiplexed header, and an associated encapsulated dynamic host configuration protocol discovery packet with a virtual channel multiplexed header;

(h) transmitting, for each VPI/VCI pair, the associated encapsulated discovery packets to a central office;

(i) determining if a valid response packet has been received to any of the transmitted discovery packets for a given VPI/VCI pair;

(j) establishing a virtual path identifier/virtual channel identifier pair value and encapsulation value based upon an encapsulation value of the received valid response and the VPI/VCI pair associated therewith; and (k) utilizing the established virtual path identifier/virtual channel identifier pair value and encapsulation value for transferring data between the asynchronous transfer mode access device and a central office.

5. The method as claimed in claim 4, wherein the encapsulated packets are segmented into fifty-three byte cells.

* * * * *